(12) United States Patent
Rodi

(10) Patent No.: US 6,912,797 B2
(45) Date of Patent: Jul. 5, 2005

(54) MEASURING SYSTEM FOR RECORDING ABSOLUTE ANGULAR OR POSITION VALUES

(76) Inventor: Anton Rodi, Paul-Ehrlich-Strasse 1, D-69181 Leimen (DE)

( * ) Notice: Subject to any disclaimer, the term of this patent is extended or adjusted under 35 U.S.C. 154(b) by 0 days.

(21) Appl. No.: 10/200,901

(22) Filed: Jul. 23, 2002

(65) Prior Publication Data

US 2002/0170200 A1 Nov. 21, 2002

Related U.S. Application Data

(63) Continuation-in-part of application No. 10/116,489, filed on Apr. 4, 2002.

(30) Foreign Application Priority Data

Apr. 5, 2001 (DE) ..................... 101 17 193

(51) Int. Cl.[7] ............................... D26D 7/28
(52) U.S. Cl. ................. 33/707; 33/706; 33/708
(58) Field of Search .................. 33/706, 707, 708, 33/761, 762, 763, 755

(56) References Cited

U.S. PATENT DOCUMENTS

| | | | |
|---|---|---|---|
| 3,648,276 A | | 3/1972 | Schuman |
| 4,363,964 A | * | 12/1982 | Schmitt ..................... 250/237 |
| 4,373,266 A | * | 2/1983 | Stutz ........................ 33/707 |
| 4,459,750 A | * | 7/1984 | Affa ......................... 33/707 |
| 4,459,751 A | * | 7/1984 | Nelle ........................ 33/708 |
| 4,465,373 A | * | 8/1984 | Tamaki et al. ................ 33/707 |
| 4,628,609 A | * | 12/1986 | Rieder et al. ................ 33/707 |
| 4,747,215 A | * | 5/1988 | Waikas ....................... 33/707 |
| 4,786,891 A | * | 11/1988 | Ueda et al. .................. 33/707 |
| 4,996,778 A | * | 3/1991 | Rieder et al. ................ 33/707 |
| 5,010,655 A | * | 4/1991 | Rieder et al. ................ 33/706 |
| 5,115,573 A | * | 5/1992 | Rieder et al. ................ 33/706 |
| 5,287,630 A | * | 2/1994 | Geisler ...................... 33/706 |
| 5,434,602 A | * | 7/1995 | Kaburagi et al. .............. 33/708 |
| 5,583,798 A | * | 12/1996 | Franz et al. ................. 33/707 |
| 5,651,187 A | * | 7/1997 | Affa ......................... 33/706 |
| 5,894,678 A | * | 4/1999 | Marsreliez et al. ............ 33/762 |

FOREIGN PATENT DOCUMENTS

| | | |
|---|---|---|
| DE | G 85 21 160.5 U1 | 3/1990 |
| DE | 195 05 176 A1 | 8/1995 |
| DE | 196 21 015 C2 | 11/1997 |
| DE | 197 24 732 A1 | 12/1998 |
| DE | 198 21 558 A1 | 2/1999 |
| EP | 0 902 255 A2 | 3/1999 |
| EP | 0 995 974 A1 | 4/2000 |

* cited by examiner

*Primary Examiner*—Christopher W. Fulton
*Assistant Examiner*—Travis Reis
(74) *Attorney, Agent, or Firm*—Laurence A. Greenberg; Werner H. Stemer; Ralph E. Locher

(57) ABSTRACT

A measuring system for the recording of angular or position values, wherein the scale includes a measurement track with absolute encoding, and which is scanned by a sensor is provided. The scale is composed of at least two segments with similar absolute encoding, and a suitable track is provided on the scale with which the absolute value of the particular segment reached is calculated by a further sensor arrangement. The total absolute value is then gained from the combination of both absolute values.

9 Claims, 4 Drawing Sheets

MEASURING SYSTEM FOR RECORDING ABSOLUTE ANGULAR OR POSITION VALUES

CROSS-REFERENCE TO RELATED APPLICATION

This application is a continuation-in-part application of application Ser. No. 10/116,489, filed Apr. 4, 2002.

The present invention relates to a measuring system for recording absolute angular or position values.

Such a measuring system, which is suitable both for angular as well as position measurements, is well known from DE 195 05 176 A1. This specification describes a linear PRC code (absolute encoding in the scale axis and one after the other in a narrow line with equal spacing of an additional incremental track) whose length is given by L=the division * bit value of the absolute code. The incremental track serves the purpose of increasing the accuracy of the respective absolute value to be determined.

With a division spacing of, for example, 20 to 30 $\mu$m and a 12 bit absolute track, total lengths of 20 $\mu$m to 30 $\mu$m*4096≈82 to 123 mm result. This maximum scale length is far too short for many purposes. If scale lengths of, for example, 4 to 5 m are to be implemented, absolute codes of more than 18 to 20 bits are needed, as indicated in DE 195 05 176 A1.

Such scales are complicated to manufacture. Moreover, the 18 to 20 photo-receivers must render the scale as distortion free as possible and this must be illuminated with light of sufficient intensity. In addition, complex signal processing is required in the evaluation electronics.

Incremental length encoders for such a scale length are versatile as regards scale design and evaluation electronics, so that they are also used for absolute measurements. To do this, one or several reference marks are necessary, which must always be approached when the system is switched on or off. The measuring device is also susceptible to loss of position, therefore this must always be taken into account by approaching the reference marks to ensure the required accuracy. This is time-consuming, not always feasible and is preferred only for cost reasons over the rarely encountered and expensive absolute measuring systems.

SUMMARY OF THE INVENTION

An object of the present invention is to provide a measuring system for recording absolute values, which can be used for large scale lengths, and which does not require a very large number of bits in the scale encoding with the associated disadvantages.

With the foregoing and other objects in view, there is provided in accordance with the invention, a linear measuring system for the recording of angular and position absolute values, where the scale includes a measurement track for generating absolute values which is recorded by an appropriate scanning head, wherein the scale is composed of at least two segments which are identical created for the generation of absolute values and wherein at least one suitable track is provided on the scale for determining the absolute value of the particular segment reached by means of a further sensor arrangement and wherein means of switching are provided which use the absolute value of the segments and the calculated absolute value within the segment to provide the total absolute value for further processing.

According to another feature of the invention, the at least one suitable track is at least one part of the measurement track composed of one or more tracks.

According to a further feature of the invention, the at least one suitable track is at least one parallel track applied onto the scale.

According to yet another feature of the invention, the particular segments are designed with the same code sections.

According to yet a further feature of the invention, the parallel track is designed for magnetic signal recording.

According to yet another feature of the invention, the parallel track contains permanent magnetic segments.

According to yet a further feature of the invention, an auxiliary power battery outside and/or inside the further sensor arrangement is provided for emergency supply.

According to yet another feature of the invention, the measuring system comprises at least two identical and staggered scanning heads whose measured values are used for redundant signal evaluation by the external control system.

According to yet a further feature of the invention, the fundamental absolute measuring system is based on optical, magnetic, inductive, electromagnetic or capacitive measuring systems or a combination thereof.

According to yet another feature of the invention, the absolute value of the segment reached is determined by logical evaluation of the traversed segments from a defined starting position.

The linear scale in accordance with the invention may be produced at a reasonable cost for any length of linear measurement and is simple to use. The complete scanning sensor's components are suitable for universal application in angular and position measuring systems and can be used for any lengths of measurement. The design of the linear measuring device in accordance with the invention takes account of the wide range of requirements and produces a universal and cost-effective device design for even the most diverse of tasks.

The idea behind the invention is to use, for example, 12 bit absolute encoded segments, which for optical scanning systems are about 10 mm in length, and a plurality thereof arranged in sequence produce the length of the scale. Advantageously these segments contain an absolute encoded track, preferably equipped with an additional incremental track running parallel for analog recording of the path in between, in order to produce a total absolute value of very high resolution. A 4 m scale contains approximately 40 such identical absolute encoded segments, for example, in PRC code, the code design for the beginnings and ends of which is taken into account for the continuous signal evaluation. A 12-bit code, for example, will result in 144 possible encodings, after which a cyclic transition to the next segment can take place.

In order to determine the absolute position as a whole, it is necessary to record the "number" of the particular segment. In accordance with the invention, this is done by recording the segments according to direction and position, and then identifying them logically from a defined starting position.

The segments must also be recorded when the main power is switched off, and therefore the consumption of energy or power needs to be low so that auxiliary power which is suitable for this purpose can be made available, for example via a battery. The power consumption of all of the previously known measuring systems for recording absolute values is far too high for this, typically between 20 mA and more than 200 mA, so that batteries cannot be used to provide the auxiliary power. According to the invention, therefore a further sensor arrangement with a suitable evaluation circuitry is provided which makes it possible to perform countable recording of segments while the associated expenditure and therefore the power consumption are kept as low as possible. The design and therefore the power consumption of this further sensor arrangement depend to a great extent on the type of recording of the absolute encoded segments to be performed.

If the absolute encoded segments are used for recording the number of the segments by means of the further sensor arrangement, this offers the advantage that the existing measurement track can be used. The sections, which are provided, for example, with a PRC code and designed as 12-bit absolute encoded sections, offer different possibilities of recording the number of sections using the further sensor arrangement. The PRC absolute track itself, for example, can be used by reducing the absolute recording to one single sensor, as described in EP 1102040 or U.S. Ser. No. 09/716, 338, and leaving out the additional evaluation of the incremental track so that the thereby simplified circuit arrangement for recording the sections requires as little auxiliary or battery power as possible.

The incremental track described above, which is advantageously arranged in parallel to the PRC track, is also suitable for the accurate recording of the segments by means of the further sensor arrangement. For this purpose, two sensors of the known simple type, for example, which are staggered by 90° (270°), can be used to record the 360° incremental division segment. Countable recording of the incremental segment is performed according to direction, and the resultant length of the absolute segment (in the case of a 12-bit code, for example, this corresponds to 4096 increments) is recorded and used to evaluate the total absolute value.

There are different ways in which the absolute segments can be encoded. A simple version is, for example, a segment generating a sin/cos signal of 360° over the entire length (for example, through magnetized N/S segments), which can be divided with a correspondingly high resolution of between 8 bits and 12 bits and more by interpolation. Such absolute segments arranged in sequence can also be used in a simple way for power-saving recording of particular absolute segments by using, for example, the well-known evaluation circuits with two sensors which are staggered by 90° in the further sensor arrangement.

For each individual absolute segment and for each of its possible designs, there are several methods and designs which are suitable for the further sensor arrangement in order to record the number of segments in a more or less power saving way. The limits to the lowest power consumption are set here by the absolute encoding selected, and these are critical to many applications with limited availability of auxiliary power. In particular in the case of applications which require battery operation over 5 . . . 10 years without recharging, the required power must be decreased to a few $\mu A$. In order to ensure this as far as possible, additional measures are provided by the invention as will be described in the following.

In accordance with a further design of the invention there is, in addition to the absolute encoded segments, a track, which permits the recording of the segments in 4 sections by interacting with, for example in its simplest design, two switch sensors, thus clearly determining the position even for extremely high process speeds. In its simplest type the track is provided with a symmetrical dark/light track for optical systems, or, for magnetic scanning, with a structure having approximately 50% of the sections magnetic and non-magnetic, and is advantageously staggered by 25% of the segments at the beginning and end of the encoded track, respectively. It is recommended to record the track magnetically which, by means of a permanent magnet, can provide the auxiliary power for the sensors used for this purpose, and which favors battery operation for signal processing and data storage due to the minimal power consumption. This detection system is also very robust and resistant to dirt. The auxiliary power battery is required to store the absolute value of the segment, to enable secure recording of position immediately after switching on the supply voltage. This also guarantees the correct absolute value of the segment when the mains power is switched on again, if the movable device is adjusted by hand when there is no mains power. The individual segments and their numbers are co-recorded as absolute values on the parallel track and thus create the absolute value when the equipment is switched on again.

The absolute value generation in each particular segment achieved in this way—quite independent of the selected process used for absolute value generation—is supplemented by means of the countable recording of segments to form the total absolute value for any length of scale. The sensor components including signal processing are housed in the complete sensor. They are the same for a plurality of angular and position measuring systems and are therefore versatile in use. The scale can be created in "endless length", the required lengths of scale can simply be separated from it. Advantageously, the data exchange and parameterizing interfaces are also designed identical to those of the rotary and angular position encoders, in order to ensure the advantageous end-to-end integration of the sensor systems in customer control systems with respect to start-up, use and service. Fully digital versions via SSI data exchange and parameterizing are especially advantageous in this respect. Encoder systems, under real-time signal processing in particular, offer redundant sensor evaluation via parallel retrievable SSI pulse signals on several encoders—each with a separate data line—and may also be used in a linear measuring system in a very dirty environment (both for the sensor and for the scale).

Other features which are considered as characteristic for the invention are set forth in the appended claims.

Although the invention is illustrated and described herein as embodied in a measuring system for recording absolute angular or position values, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
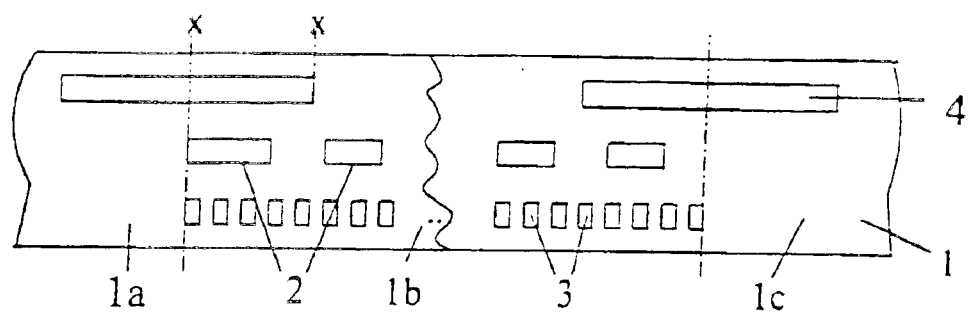
FIG. 1 shows the structure of the scale.

FIG. 1 shows a part of a scale 1 which is provided with a track 2 encoded with, for example, 12-bit absolute values. This means that the appropriate scanning head comprises an array of twelve scanning cells, each of which recognize a new absolute value after a movement of one increment. Three segments 1a to 1c are shown here, whereby only an extract of the central segment 1b can be seen. In one segment there are $2^{12}$=4096 distinct increments present, for example in PRC code. The total scale is made up of several segments 1a to 1c. An incremental track 3 is positioned below track 2, and is used to increase the accuracy of each of the particular values of the absolute track 2; it has the same total length as the scale. Both track 3 and track 2 form the absolute encoded segments and can be used, individually or in combination with the further sensor arrangement, for countable recording of the segments.

In addition to the said tracks according to the invention an additional track 4 of the same length as the segments can be provided, which is used to recognize and record the segments and is based on a defined starting position to logically determine the direction and position of the segments. Thus the "number" of individual segments can therefore be determined. In its simplest form, the track is equipped with a symmetrical dark/light track for optical systems, or, for a track with magnetic evaluation, with 50% of the segments having either a magnetic or non-magnetic structure. It is important that at the transitional points from one segment to another, for example from 1a to 1b, a magnetic structure is present and is located staggered by approximately 25% of the segments. This is shown in FIG. 1 where, for the purposes of track 4, it may be assumed that segment 1b is shown in its entirety. Only by doing this can it be shown that 50% of the track is magnetic and 50% non magnetic. The track is scanned with, for example, two switch sensors, to determine clearly the point of transition. The switch sensors are positioned advantageously at a distance of approximately 25% of the segment. This allows recording of the 4 quadrants of the segments marked, for example with an x in FIG. 1, (2 times 25% magnetic, 2 times 25% non-magnetic), at approximately 2 m/sec, even at a very high measuring speed of, for example, 10 m/sec., which is certainly sufficient even for slow sensors such as Reed switches or pulsed magnetic sensors. This is important for the evaluation of the segments to be counted under all sorts of on/off switching operations of the supply voltage and for the logical composition of the absolute value using the segments and necessitates careful design. It is not intended to further explain here that higher sensor switch speeds would allow them to be located at much smaller distances than 25% of the segment, for example in an integrated module. Hence, the actual position is calculated from the absolute value of track 2, enhanced possibly by track 3, and the determination of the "numbers" of segments with track 4.

The term 'parallel track' shall also include those cases in which the encoding of the parallel track provided to determine the number of the segment superimposes the measurement track, and where the further sensor arrangement only record the encoding assigned to them.

Figure 2:
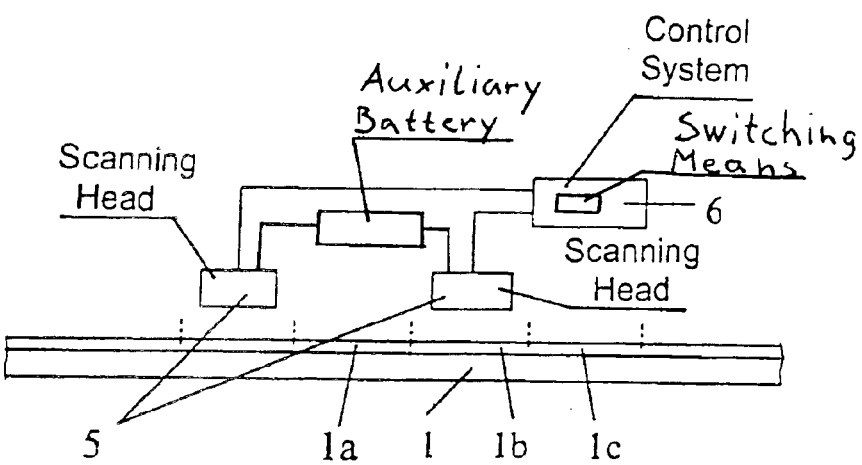
FIG. 2 shows the scale with scanning heads.

FIG. 2 shows a side view of scale 1 with a number of segments, for example 1a to 1c. There are two staggered scanning heads 5, whose measurement results are used for a redundant signal evaluation and are processed accordingly in the control system 6.

Figure 3:
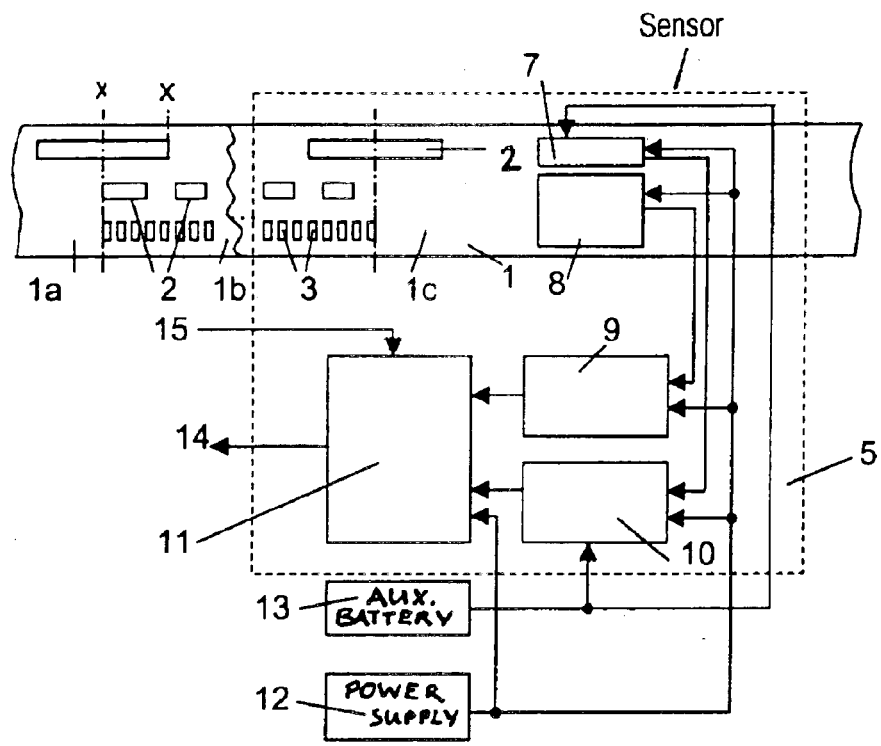
FIG. 3 is a schematic view of an embodiment of a measuring system according to the invention.

FIG. 3 shows the scale 1 with the sensor components and an exemplary signal processing, which includes the sensor 5. The further sensor arrangement 7 is supplied, together with the associated switching means 10 of the absolute values of the segments, form the mains power 12 as well as from an auxiliary power 13, such as a battery, such that during a mains disconnection the function is maintained and no segment measurement values are lost.

The measurement track 2, 3 detected by the scanning head 8 results in the generation of the absolute values 9 within the segments and needs only function when mains-power is provided. The two absolute values 9 and 10 are consequently used for generating the total absolute value 11 which is provided by 14 for further processing wherein the defined starting position 15 are taken into account.

Figure 4:
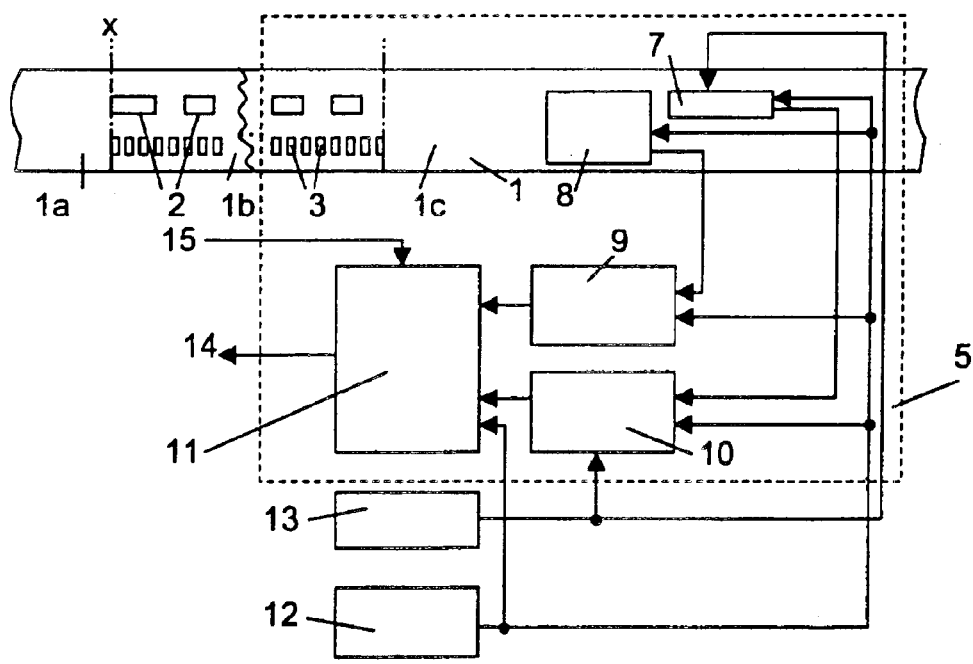
FIG. 4 is a schematic view of another embodiment of a measuring system according to the invention.
Figure 5:
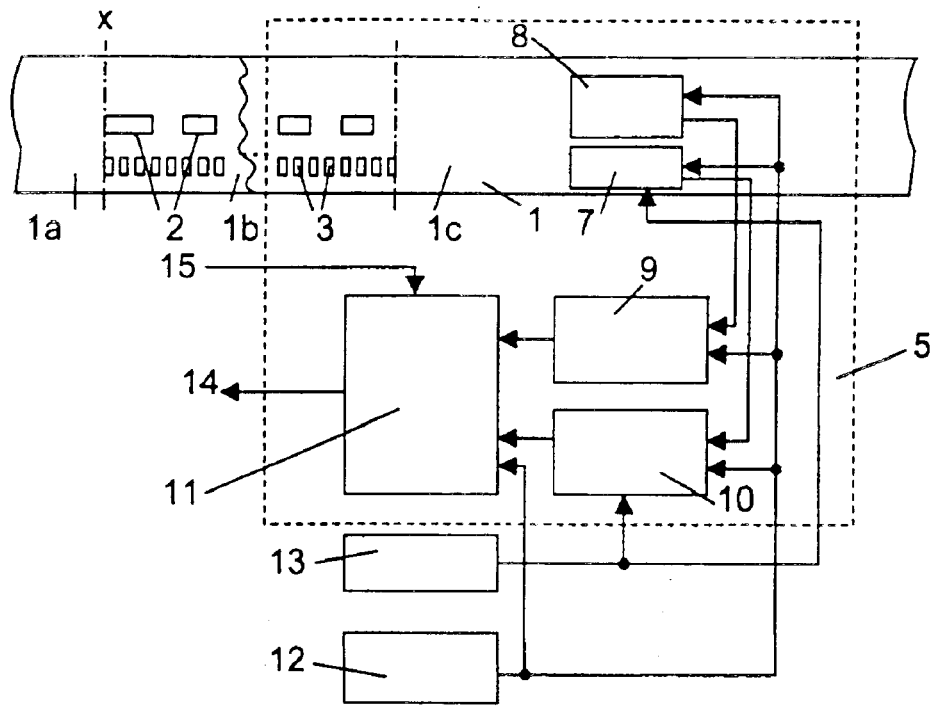
FIG. 5 is a schematic view of a further embodiment of a measuring system according to the invention.
Figure 6:
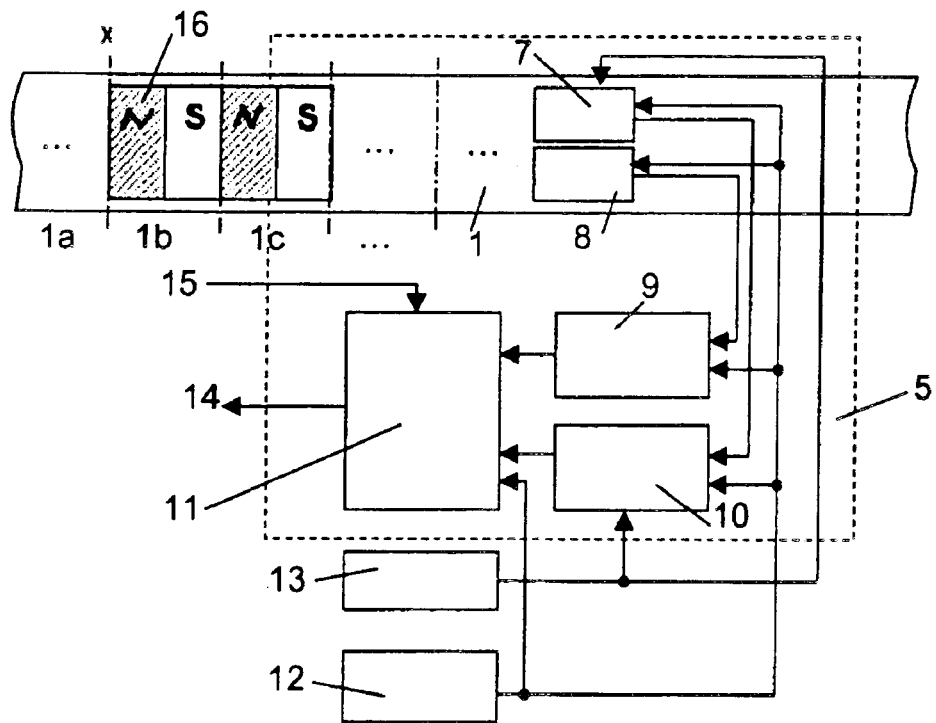
FIG. 6 is a schematic view of yet another embodiment of a measuring system according to the invention.

FIGS. 4 to 6 show various scales with absolute measuring tracks and the respectively assigned arrangement of the scanning head 8 for an absolute recording within the segment and the further sensor arrangement 7 for forming the absolute value of the segments. This signal processing is accomplished in the same manner as described above for the embodiment shown in FIG. 3.

Figure 7:
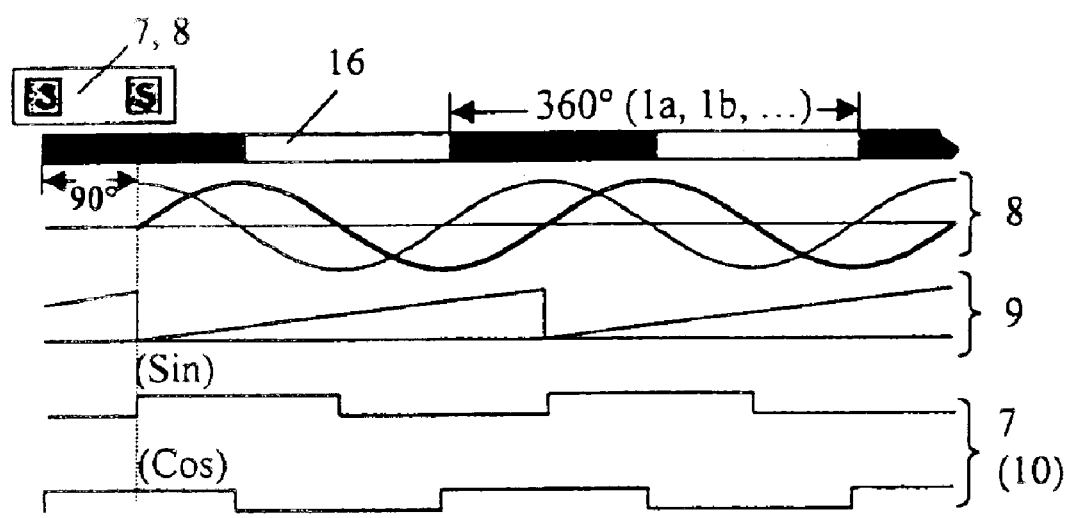
FIG. 7 is a graph illustrating a signal course over time.

FIG. 7 illustrates the operating mode of the exemplary advantageous scale shown in FIG. 6. The embodiment shown in FIGS. 4 to 7 have already been explained in detail in the description above and therefore no further explanations are necessary.

I claim:

1. A linear measuring system, comprising:

a scale including at least two segments identically created for the generation of absolute values, each of said at least two segments including a measurement track for generating the absolute value within said segments being recorded by an appropriate scanning head, and at least one suitable track being at least one part of said measurement track for determining the absolute value of the particular segment reached by a sensor arrangement; and a switching device using the generated absolute value within said segments and the determined absolute value of said segment to provide the total absolute value for further processing.

2. The measuring system according to claim 1, wherein said at least one suitable track is composed of one or more tracks.

3. The measuring system according to claim 1, wherein said segments are constructed with the same code sections.

4. The measuring system according to claim 1, further comprising an auxiliary power battery outside or inside said sensor arrangement for emergency supply.

5. The measuring system according to claim 1, comprising at least two identical and staggered scanning heads whose measured values are used for redundant signal evaluation by an external control system.

6. The measuring system according to claim 1, wherein the measuring system is based on at least one system selected from the group consisting of an optical, a magnetic, an inductive, an electromagnetic and a capacitive measuring system.

7. The measuring system according to claim 1, wherein the absolute value of said segment reached is determined by logical evaluation of traversed segments from a defined starting position.

8. The measuring system according to claim 1, wherein the absolute value of the segments and the determined absolute value within the segment are linear values.

9. The measuring system according to claim 1, wherein the absolute value of the segments and the determined absolute value within the segment are angular values.

* * * * *